July 6, 1971     A. J. MATESI     3,591,442

DECORATIVE WREATHS

Filed Dec. 19, 1967

INVENTOR
ANDREW J. MATESI

BY *alter and Weiss*

ATTORNEYS

United States Patent Office 3,591,442
Patented July 6, 1971

3,591,442
DECORATIVE WREATHS
Andrew J. Matesi, 3742 N. Troy, Chicago, Ill.
Filed Dec. 19, 1967, Ser. No. 691,792
Int. Cl. A47g *33/08*
U.S. Cl. 161—15                                    4 Claims

ABSTRACT OF THE DISCLOSURE

Artificial wreaths comprising base units that are substantially semi-toroidally shaped and equipped to have decorations such as artificial boughs and figurines removably attached thereto.

This invention relates to decorative wreaths and more particularly to artificial wreaths such as used for Christmas decorations.

Decorative wreaths have been used since time immemorial. Presently, wreaths are used most extensively for Christmas decorations, and generally are hung on the front doors. Christmas wreaths have been made from natural coniferous boughs. The difficulty encountered using such decorative wreaths has been that they can only be used for one season; and even then only for relatively short periods of time.

More recently, wreaths made from plastic imitation boughs have been available. Such wreaths are, however, relatively expensive. Also, even though such plastic wreaths can be used over relatively long periods of time, they lack the novelty, vitality and freshness of the annually replaced wreaths made from natural boughs.

Accordingly, an object of this invention is to provide a decorative wreath that can be repeatedly re-used and none-the-less present a new image each year.

A related object of the invention is to provide artificial decorative wreaths that are relatively easy to mount and/or store for the next years' use.

According to a preferred embodiment of the invention, the inventive artificial wreath comprises a base section that has a periphery which is substantially semi-toroidially shaped. The base is provided with a plurality of apertures. The apertures or holes are used for removably mounting decorative greenery, figurines or letters spelling out words of greetings. The mounted decorations can be left on the base unit and reused every occasion, such as Christmas. It is also within the scope of the invention that the base unit can easily be equipped with new decorations to revitalize the decorative wreath or else the already mounted decorations are amenable for easy rearrangement.

The above-mentioned and other objects and features of the inventive decorative wreath will better be understood and become more apparent from the following detailed description taken in connection with the accompanying drawings, wherein.

Figure 1:
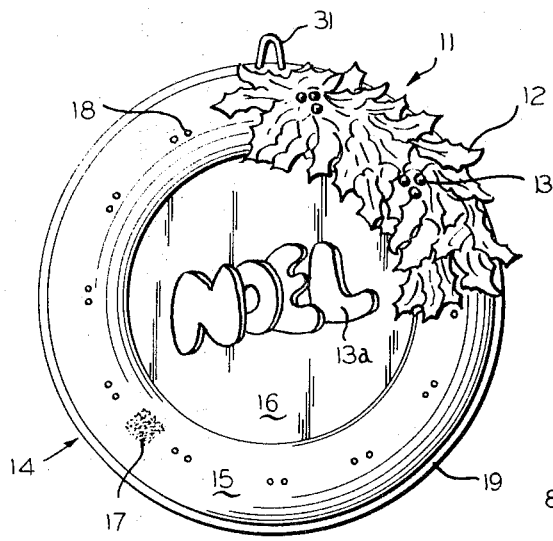
FIG. 1 illustrates a front view of the base unit of the wreath partially decorated with greenery and letters spelling out greetings.
Figure 5:
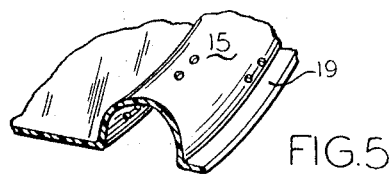
FIG. 5 is a sectional view of the base unit taken along line 5—5 of FIG. 2, looking in the direction of the arrows.
Figure 2:
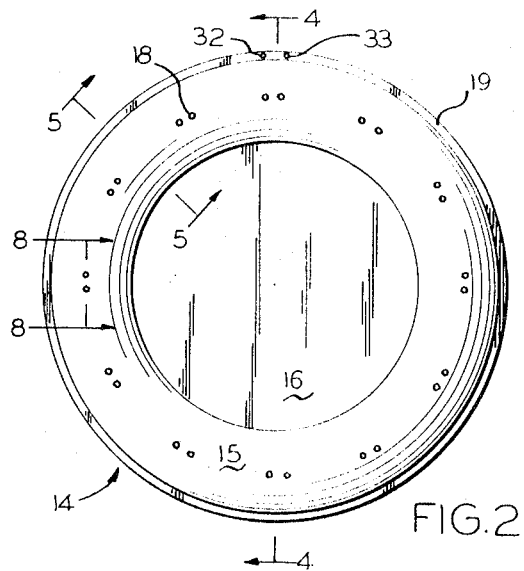
FIG. 2 is a front view of the base unit of the decorative wreath.

Similar characters of reference indicate corresponding parts throughout the several views and referring now to the same, the wreath 11 shows an inventive decorative wreath partially decorated with foilage such as artificial leaves 12 and berries 13 mounted on a base unit 14. The base unit 14 has a substantially semi-toroidally shaped peripheral section 15. The center of the toroid may be vacant or the base unit 14 may have a disc-shaped center section 16 integrally joined to the peripheral semi-toroidal section.

Means are provided for attaching the decorations to the base unit. The attaching means may comprise sections of a gummed gluey substance, such as indicated by the dotted section 17 shown on FIG. 1. The preferred decoration attaching means, however, comprises the plurality of holes, such as hole 18 which are liberally distributed around the peripheral section and may be included in the disc-shaped center section 16.

The peripheral section 15 is shaped like a toroid that has been laterally sliced, as is best seen in the sectional views. Thus, the peripheral sections are best described as being semi-toroidally shaped.

The outer circumferential edge of the peripheral sections may, as shown, have a flat extending ledge-like projection 19. The ledge 19 provides a surface for abutting the door, wall or other vertical surface upon which the wreath may be hung. The ledge section because of its flat shape, assures that the vertical hanging surface, such as that provided by a door, will not be injured or damaged by the decorative wreath.

Figure 3:
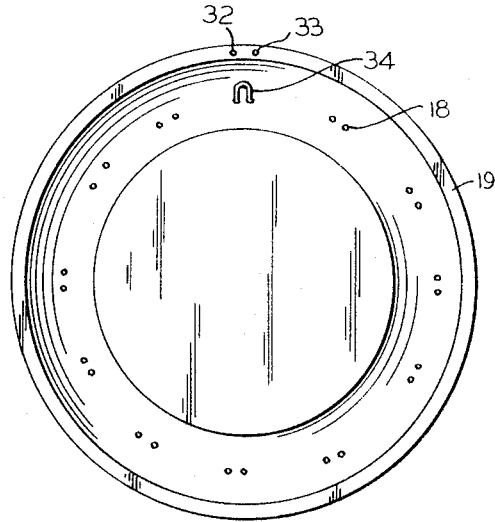
FIG. 3 is a rear view of the base unit of the decorative wreath.

As is best shown in the sectional views and in the rear view of FIG. 3, the peripheral semi-toroidal section is hollow. This aids in fastening the decorations to the base unit.

Figures 7, 8:
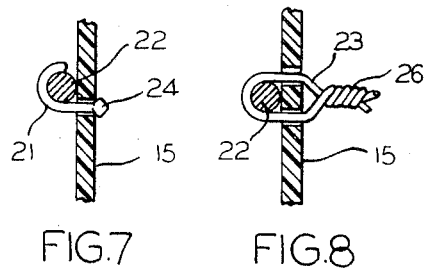
FIGS. 7 and 8 show different embodiments of mounting means utilizing the noted apertures for attaching the decorations to the base units.

Means, such as the knobbed plastic binding 21 shown in FIG. 7, may be used to removably attach wreath decorations such as the stem section 22 of an artificial bough. Alternatively, wire 23 could be used to attach the decorations to the base unit. The view showing wire 23 used indicates how the paired relationship of the apertures is utilized to provide a secure bonding of the decorations to the base unit.

The plastic binding 21 may be an integral part of the artificial greenery or it may be a separate binding section, in which case two juxtaposed holes would be used by the knobbed binding 21 to assure a reliable attachment of the decorations. As shown in FIG. 7, the knobbed binding 21 ends in knob 24. The knob 24 is made of a plastic, or some similar material, having sufficient resiliency whereby the knob can be forced through the aperture and reliably secure the decorations to the base unit. The decoration could be removed by sharply jerking or pulling on the binding 21, forcing knob 24 back out through the aperture.

In FIG. 8 the wire 23 is shown twisted together at 26 to reliably secure the decorations to the base unit. This type of fastening is relatively permanent. However, the wires could be unwound or snipped when a change of decorations is desired.

Figures 4, 6:
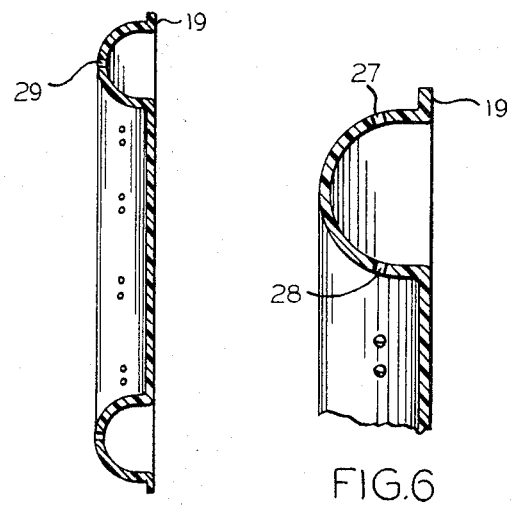
FIG. 4 is a sectional view of the base unit of FIG. 2 taken along line 4—4 looking in the direction of the arrows.
FIG. 6 is an enlargement of the top portion of FIG. 4 to best show the decoration receiving apertures in the base unit.

FIGS. 4 and 6 especially emphasize that the holes or apertures are spread throughout the base unit. Thus, apertures such as holes 27, 28 and 29 appear on every portion of the arc comprising the semi-toroidal peripheral section.

Means, such as wire loop 31 could be used fitted through a pair of the topmost apertures 32 and 33 for hanging the decorative wreath. Alternatively, the wire loop 34 (FIG. 3) could be provided on the inner arc to better camaflouge the hanging means.

It should be understood that the base unit of the inventive wreath may be fabricated from any material including but not limited to plastic or aluminum. Similarly, the decorations that are attached thereto could be natural or artificial greenery.

While the principles of the invention have been described above in connection with specific apparatus and applications, it is to be understood that this description is made only by way of example and not as a limitation on the scope of the invention.

I claim:
1. A decorative wreath for displaying a combination of natural and artificial floral material,
   said wreath comprising a base unit,
   said base unit having an empty substantially semi-toroidal, non-backed, peripheral section surrounding a disc-like center section,
   said base unit being comprised of a shell of non-porous material,
   means comprising artificial floral material distributed over a predetermined arc of said shell,
   a plurality of apertures in said base unit for mounting decorations thereto,
   binding means extending through at least some of said apertures for attaching natural floral material to said shell, and
   an outer circumferential ledge on said base unit for protecting the surface upon which said decorative wreath is mounted.
2. The decorative wreath of claim 1 wherein said aperture means are uniformly distributed over a circular center section of said semi-toroidal shell for removably mounting decorations thereto.
3. The decorative wreath of claim 2 wherein said binding means comprises a wire-like material having an enlarged head on one end thereof,
   said wire-like material fitting through at least one of said apertures, and
   said head being too large to pass through said aperture whereby the tip of said wire may be passed through said aperture and wrap around a natural floral material to hold it on said shell.
4. The decorative wreath of claim 2 wherein said binding means comprises a U-shaped loop,
   the bottom of said U passing over said natural floral material, and
   the two arms of said U passing through two of said apertures to hold said floral material on said shell.

References Cited

UNITED STATES PATENTS

| | | | |
|---|---|---|---|
| 2,761,233 | 9/1956 | Brown | 161—15X |
| 1,593,450 | 7/1926 | Heaven | 161—15X |
| 1,609,056 | 11/1926 | Bouchard | 161—15 |
| 2,115,358 | 4/1938 | Buschman | 240—10 |
| 3,110,647 | 11/1963 | Tong | 161—15X |
| 3,302,327 | 2/1967 | Fant | 47—41.12 |

JOHN T. GOOLKASIAN, Primary Examiner

H. F. EPSTEIN, Assistant Examiner

U.S. Cl. X.R.

40—125; 47—41; 161—109